May 27, 1941.  C. E. VOLK  2,243,233
MATERIAL SPREADER
Filed June 13, 1938  2 Sheets-Sheet 1
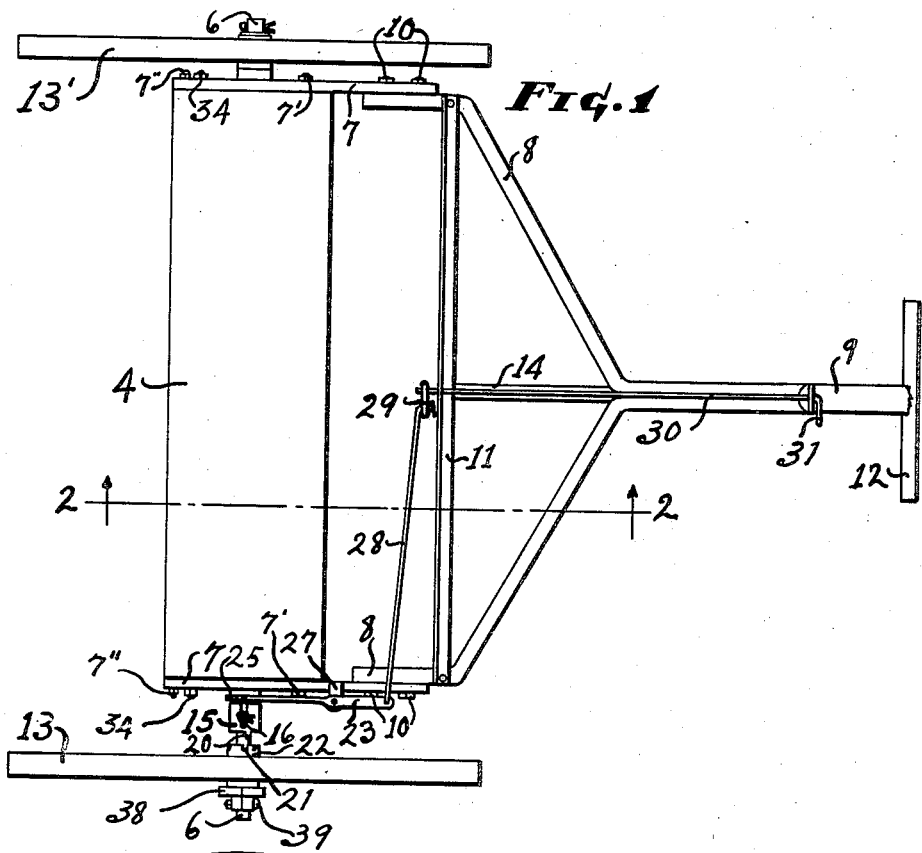
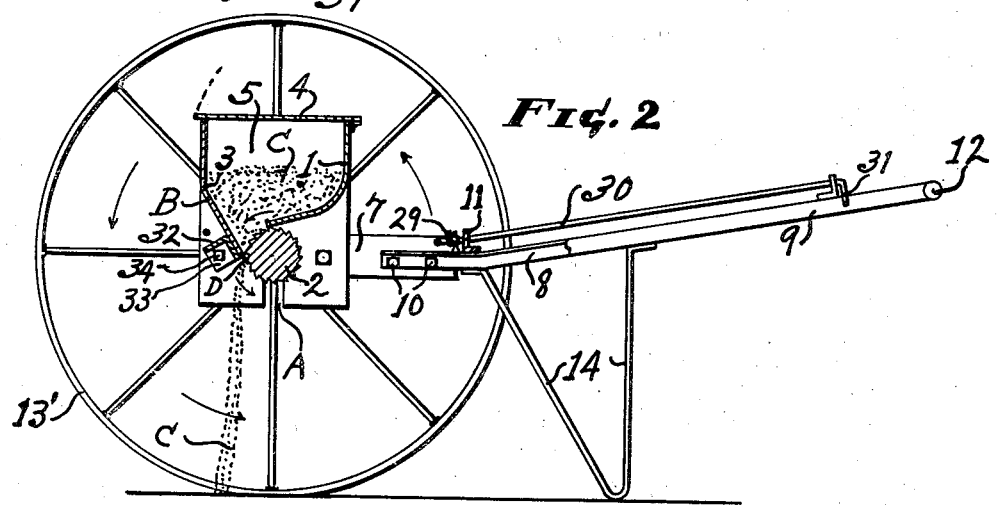
INVENTOR.
CHARLES E. VOLK
BY U. G. Charles
ATTORNEY.

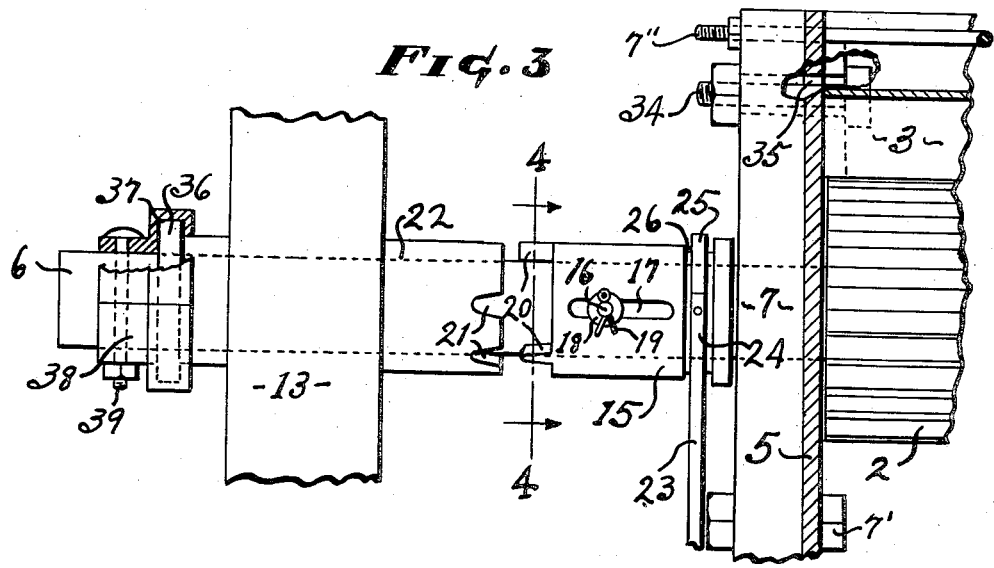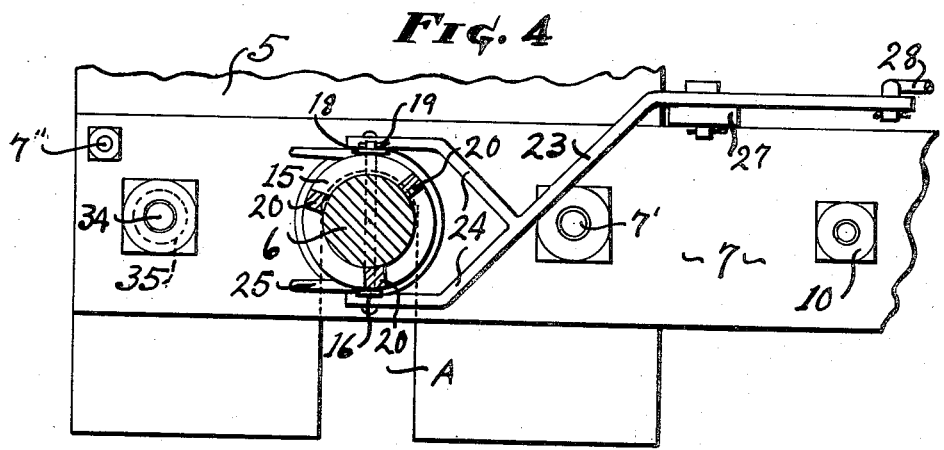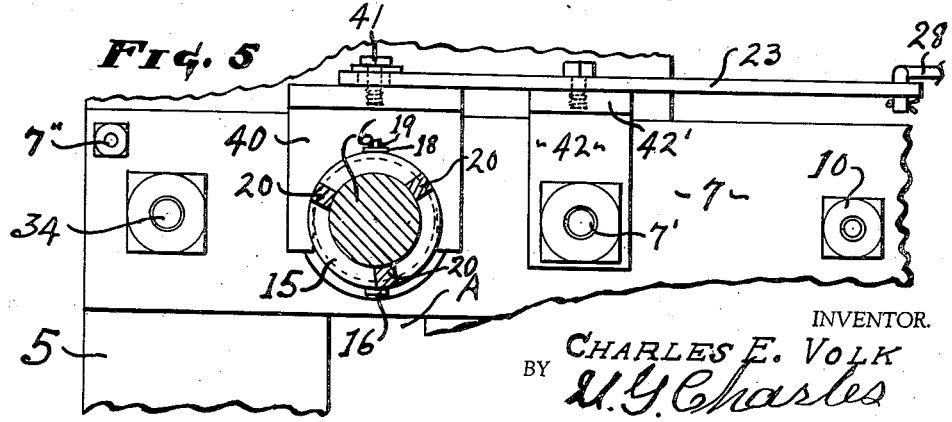

Patented May 27, 1941

2,243,233

UNITED STATES PATENT OFFICE 2,243,233

MATERIAL SPREADER

Charles E. Volk, El Dorado, Kans.

Application June 13, 1938, Serial No. 213,547

1 Claim. (Cl. 221—130)

My invention relates to a material spreader, and has for its chief object the provision of a grinding and dispensing feed cylinder for chemical compound contained in the hopper, the cylinder being rotatable with the wheel or stationarily retained as the machine is conveyed.

A further object of my invention is to provide an adjustable trough for the chemical hopper to economize and equalize the discharge of the chemical as the machine is conveyed.

A still further object of my invention is to provide a cylindrical feed cylinder having a plurality of teeth spaced therearound and extending longitudinal of the cylinder.

A still further object of my invention is to provide an inexpensive machine, effective in its performance, and manually conveyed.

These and other objects will hereinafter be more fully explained, reference being had to the accompanying drawings, forming a part of this specification, and in which like characters will apply to like parts in the different views.

Referring to the drawings:

Fig. 1 is a plan view of the spreader.

Fig. 2 is a sectional view taken on line 2—2 in Fig. 1.

Fig. 3 is an enlarged plan view of the clutch member and fragmentary portion of the feed cylinder, parts removed for convenience of illustration.

Fig. 4 is a sectional view taken on line 4—4 in Fig. 3.

Fig. 5 is a similar view to that of Fig. 4, but modified with respect to the shifting means for the clutch.

My invention relates to a material spreader, comprising a hopper having a rear wall member 1, curved to form a side and bottom, the bottom terminating at the upper side of a toothed feed cylinder 2, and being in close proximity thereto, as shown in Fig. 2, and a wall member 3 to close the other side, said wall member extending downward and inward toward said feed cylinder and being adjustable as hereinafter described. The said cylinder has a plurality of teeth spaced therearound and extending longitudinally from end to end of said cylinder, the front side of said teeth, with respect to turn, (shown by arrows in Fig. 2) being radially positioned, while the other side tangent with respect to the axis of the cylinder, by which means the said teeth will grind and dispense the chemical to a desired comminution by the adjustment of wall member 3 later described. Hingedly connected to said wall member 1 is a lid 4, by which means access is had to the said hopper to fill the same or remove therefrom the chemical preparation for the extermination of the bindweed or like obnoxious plants. Each end of the hopper is enclosed by a plate 5 that is slotted as at A to engage on a spindle 6, the plates 5 being welded to the respective ends of wall 1 and to the front wall 3, except from its bend B downwardly, which is free to spring toward and from the said feed cylinder.

Secured to each plate 5 is a bar 7 by bolts 7' and rod 7", said bar being apertured to engage on said spindles as carrying means for the hopper and to which the bifurcations 8 of a tongue 9 are secured by bolts 10, the legs of the bifurcations being tied together by a cross bar 11, as shown in Fig. 1.

Transversely positioned and secured to the outer end of the tongue is a handle 12, for manual conveyance of the spreader, that is carried by wheels 13 and 13' trunnioned on said spindle 6 and free to rotate thereon. Attached to the under side of the tongue is a support 14, by which means the tongue is supported on an approximate horizontal plane during idleness of the spreader.

As above stated, the said wheels are free to rotate on their respective spindles as means to avoid rotation of the said feed cylinder, as the said spindles are integrally joined thereto, functioning also as an axle, by which means conveyance of the spreader from place to place may be accomplished without waste of the chemical contained in the hopper, and to cause rotation of the feed cylinder, I have positioned on one of the spindles in working relation to wheel 13 a clutch member 15, slideable on the spindle longitudinally thereof, but rotatable therewith through the medium of a headed pin 16, extending diametrically through the spindle, the outer ends of the pin adapted to engage in elongated slots 17 passing through the wall of the clutch member, each slot being in registry with its respective end of the pin, and the pin having a washer 18 positioned on the end opposite its head, and resting on the wall of said clutch member and secured thereto by a cotter pin 19, by which means the said pin is removable.

Extending from the outer end of the slideable clutch member are three lugs 20, equally spaced therearound that are adapted to engage in notches 21 in registry therewith, there being six of said notches to selectively engage with the lugs, said notches equally spaced around the hub 22, integrally joined to wheel 13.

To engage or disengage the clutch elements above described, there is provided a lever 23, having legs 24, the outer ends of which pivotally connect to a U-shaped yoke 25 that is adapted to engage in an annular groove 26 around the inner end of the clutch member 15 as shifting means therefor, and to actuate said member 15, it will be seen that lever 23 is pivotally connected to a bar 27 that is secured to the upper edge of said bar 7, and rockable thereon through the medium of a rod 28 connecting the free end of said lever to a crank 29, that is secured to and rocked by a rod 30, that is pivotally carried on the tongue and said cross bar 11, the rod having a right angle bend as at 31 on its end adjacent the handle 12, and to be turned manually, by which means, during conveyance of the vehicle the shifting mechanism for the chemical may be controlled.

As heretofore stated, the wheels of the spreader are free to turn on their respective spindles, and by engagement of the clutch member the spindles rotate with the wheels as turning means for the said feed cylinder 2, functioning as dispensing means for the chemical preparation C, ejected outward between said cylinder and the lower edge of front wall member 3, as at D, said wall being flexible and carried at its lower extremity by an L-shaped bar 32, extending therealong from end to end, and the said bar has end members 33, positioned at right angles to the bar to slideably engage against their respective bolts 34. The adjustment to move the lower edge of the front wall is accomplished by the aperture 35 being greater in diameter than the said bolt, as shown in Fig. 3 and dotted lines in Fig. 4, by which means the volume of chemical dispensed may be governed, and also reduced to fine comminution by grinding the coarse portions of the chemical between the edge of said wall and the teeth of the cylinder.

As a convenient means to secure each wheel to its respective spindle, it will be seen in Fig. 1 that wheel 13' is secured on its spindle by a pin passing through the outer end thereof, while wheel 13 in view of its clutch, has on the outer end of its hub an annular flange 36 to engage in a groove 37 of a hub cap 38, that is divided diametrically and secured together by a bolt 39 that simultaneously holds the cap on the spindle as shown in Fig. 3, by which means sliding movement of the wheel hub on the spindle longitudinally is avoided, and the said wheel may be removed by dissembling the cap as secured by its bolt.

In Fig. 5 is shown a modification for the clutch shifting device, consisting of a vertically disposed plate 40, having a U-shaped cut in the lower end thereof to engage in said groove 26, the plate being carried by said lever 23 that is straight in this instance, and is secured thereto by a cap screw 41, engaging through an aperture passing through said lever, the diameter of which is greater than the shaft of the screw to accommodate working movement required, and the said lever is pivotally connected to a bracket 42, having a right angle bend at the upper end thereof, as at 42', on which said lever will rest, said bracket being secured to bar 7 by bolt 7'; otherwise, the arrangement is similar to that shown in Figs. 3 and 4.

While I have shown and described a specific form of teeth for the feed cylinder, the same may be modified with respect to cross section, length, or other peripheral interruption, as by kneeling or by spirally wound teeth for abrasion, and such other modifications may be employed as lie within the scope of the appended claim.

Having fully described my invention what I claim as new and desire to secure by Letters Patent is:

In a hopper for a material spreader, the hopper comprised of front, rear and end walls, and a hingedly connected lid to close the upper portion of the hopper, the rear wall curved downward and inward with respect to cross section, the front wall having a bend intermediate of its upper and lower edges, the portion below the bend extending inward and adapted to flex whereby an opening is provided between the lower terminal edges of said front and rear walls, and a toothed axle journalled in the end walls and disposed lengthwise to partially engage in the opening so that the terminal edge of the rear wall is in close proximity to the points of the axle teeth and substantially in vertical alignment with the turning axis of the axle, the terminal lower edge of the front wall being movable toward and from the said points of the axle teeth and terminating approximately on a horizontal plane with the turning axis of said axle, and an angle bar secured to the front wall outward thereof and in close proximity to its lower edge, said bar having a plate to close each end with respect to the legs of the angle, and each of said plates being drilled and having a bolt extending outward therefrom and each end wall of the hopper having an aperture to register with its respective bolt axially, the apertures being greater in diameter than that of the bolts whereby the lower edge of the front wall is moved inward or outward to space said edge portion at a selected distance from the points of the axle teeth and secured by the bolts, clamping said angle bar plates to snug engagement with the respective end walls, substantially as shown and described.

CHARLES E. VOLK.